J. VAN ALLEN & J. CARROLL.
Flower-Baskets.
No. 153,132.
Patented July 14, 1874.
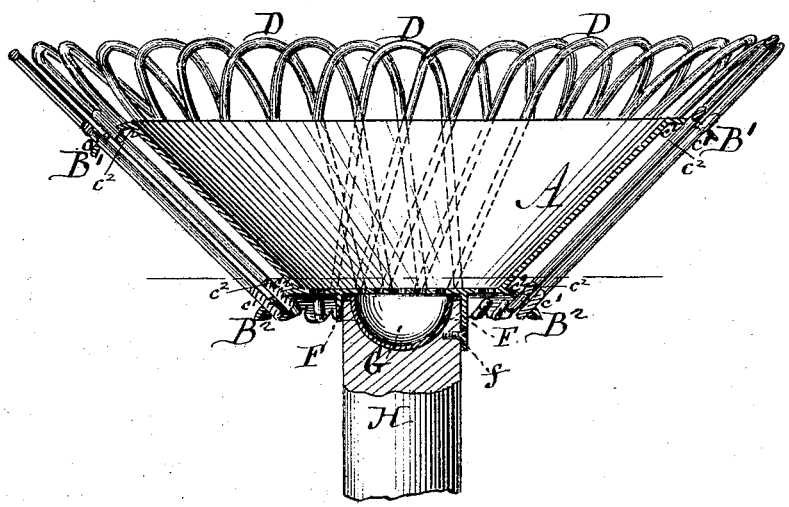
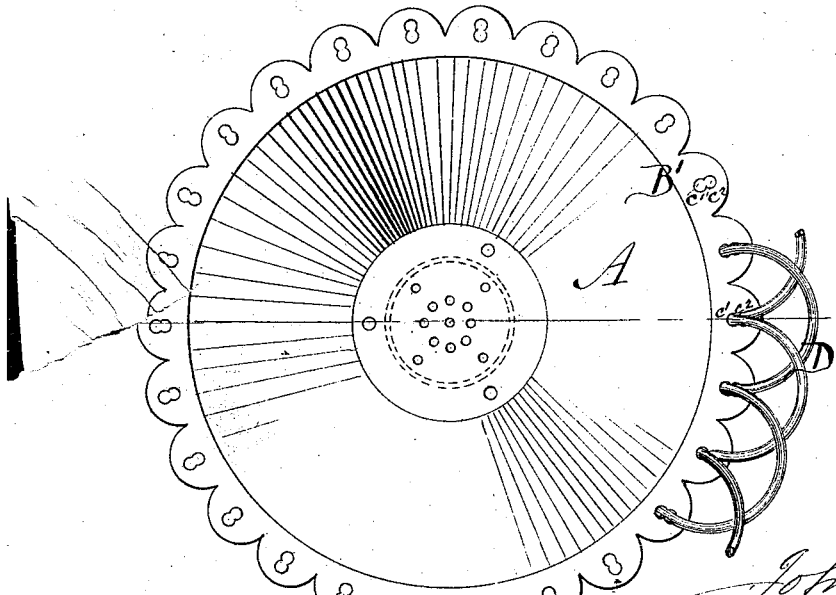
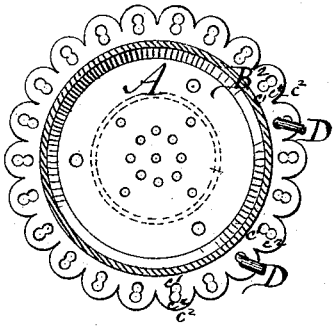

UNITED STATES PATENT OFFICE.

JOHN VAN ALLEN AND JOHN CARROLL, OF BATH, NEW YORK.

IMPROVEMENT IN FLOWER-BASKETS.

Specification forming part of Letters Patent No. 153,132, dated July 14, 1874; application filed April 11, 1874.

*To all whom it may concern:*

Be it known that we, JOHN VAN ALLEN and JOHN CARROLL, of Bath, in the county of Steuben and State of New York, have invented an Improved Flower-Basket, of which the following is a specification:

Our invention relates to certain improvements designed more particularly for application to hanging-baskets, or baskets for gardens and lawns. The invention consists in a cast or sheet-metal tapering pan, formed with a flange at top and bottom, perforated to receive metallic or other rods, forming arches extending above the upper flange.

In the accompanying drawing, Figure 1 is a vertical section of our improved basket. Fig. 2 is a top view of the same. Fig. 3 is a horizontal section, showing the bottom and lower flange.

The pan A may be circular, elliptical, or polygonal in the outline of its upper and lower edges. Its sides taper outward and upward from the bottom to the upper edge. At the upper edge is a horizontal flange, $B^1$, and from the bottom extends a similar flange, $B^2$. These flanges may be scalloped, as shown, and have in each scallop two perforations, $c^1$ $c^2$, which may lie in a radial direction with relation to each other and the center and circumference of the basket. These perforations receive rods D, which may be of wire, wood, or any other suitable material. Each rod is bent, about midway of its length, in the form of an arch. One end of the rod is inserted in the perforations $c^1$, and the other end is inserted in the perforations $c^2$ in the upper and lower flanges, so that one half of each rod crosses the opposite half of the next adjoining rod above the upper flange, crossing the second rod in passing through the upper flange, crossing the third rod at a point between the upper and lower flanges, and entering the lower flange at a point immediately adjoining the fourth rod, thus forming a series of intersecting arches above the upper flange, and a rhombic or rhomboidal network between the upper and lower flanges, as shown in Fig. 1. On the bottom of the pan is a ring or band, F, which may be formed in one piece with the pan, when made of cast metal, or attached afterward when made of sheet metal. This band is provided with perforated lugs $f$, by means of which the pan may be attached to the upper end of a standard or pedestal, H, by screws or nails.

In the upper end of the pedestal H is a bowl or tank, G, which may be coated with metal or other water-proof material. This tank is filled with water for supplying moisture to the pan. The bottom of the pan is perforated, and may have sponge or moss or other fibrous substance placed therein, for filtering the water supplied to the basket from above.

What we claim as new, and desire to secure by Letters Patent, is—

The pan A, formed with the perforated flanges $B^1$ $B^2$, in combination with rods D, substantially as shown and described.

JOHN VAN ALLEN.
JOHN CARROLL.

Witnesses:
PHILANDER P. THORP,
H. R. HESS.